(12) United States Patent
Kirckof

(10) Patent No.: US 6,375,223 B1
(45) Date of Patent: Apr. 23, 2002

(54) MUD FLAP SYSTEM

(76) Inventor: Roger Kirckof, 101319 3/4 St., Cameron, WI (US) 54822

( * ) Notice: Subject to any disclaimer, the term of this patent is extended or adjusted under 35 U.S.C. 154(b) by 0 days.

(21) Appl. No.: 09/638,581

(22) Filed: Aug. 15, 2000

(51) Int. Cl.$^7$ ................................................. B62B 9/14
(52) U.S. Cl. ...................................... 280/851; 280/154
(58) Field of Search ................................ 280/851, 848, 280/847, 154, 159, 155, 495, 506; D12/185, 184, 162; 248/228.1, 226.11, 227.4, 316.8, 214, 223.41

(56) References Cited

U.S. PATENT DOCUMENTS

| | | | | |
|---|---|---|---|---|
| 3,428,372 A | * | 2/1969 | Keller et al. | ................... 308/15 |
| 3,934,901 A | * | 1/1976 | Hammerly | ............ 280/154.5 R |
| 4,541,646 A | * | 9/1985 | Knowley | ............. 280/154.5 R |
| 5,026,094 A | | 6/1991 | Haddox | |
| 5,121,944 A | | 6/1992 | Haddox | |
| D328,447 S | | 8/1992 | Ahleen | |
| D330,692 S | | 11/1992 | Hammond, Jr. | |
| 5,489,111 A | * | 2/1996 | Collins | ........................ 280/495 |
| 5,833,254 A | | 11/1998 | Bucho | |
| D415,086 S | | 10/1999 | Larkin et al. | |
| 6,076,842 A | * | 6/2000 | Knoer | ......................... 280/154 |
| 6,105,989 A | * | 8/2000 | Linger | ......................... 280/506 |

* cited by examiner

Primary Examiner—Brian L. Johnson
Assistant Examiner—Gerald Klebe
(74) Attorney, Agent, or Firm—Merchant Gould P.C.

(57) ABSTRACT

A mud flap system and method for attaching mud flaps to vehicles are provided. The mud flap system is arranged and configured for attachment to a receiver hitch mounted on a vehicle. The receiver hitch includes a transverse bar which includes a tubular wall. The mud flap system includes (a) a mud flap, (b) an integral (i.e., one-piece) beam having a first portion attached to the mud flap and a second portion fastenable to the transverse bar, and (c) a retaining device mounted on the beam and configured to fasten the second portion of the beam to the transverse bar without penetrating any portion of the tubular wall. The mud flap system maybe adapted for use with a transverse bar that has a protuberance, such as a flange, thereon. The second portion of the beam is adapted to be inserted into the opening in the ends of the transverse bar. The retaining device includes an integral retaining block that can be fastened to the beam. The retaining block also has a groove that engages the protuberance on the tubular bar when the retaining block is fastened to the beam. The retaining device of the mud flap system above may also include a U-bolt fed through two holes in a brace. The U-bolt and the brace form a loop of a sufficient size to encompass the end of the transverse bar. When the U-bolt is tightened sufficiently, then the beam is secured to the transverse bar. In cases where the beam is designed to be inserted into the opening formed in the end of the transverse bar, spacers such as bolts may be attached to the inserted portion of the beam to ensure a snug fit of the beam inside the transverse bar.

8 Claims, 5 Drawing Sheets

MUD FLAP SYSTEM

BACKGROUND OF THE INVENTION

1. Field of the Invention

The present invention relates generally to mud flap systems and more particularly to a mud flap system arranged and configured to cooperatively attach to a trailer hitch of a vehicle without modifying the trailer hitch.

2. Description of the Related Art

Mud flaps are widely used on motor vehicles, such as trucks. Various devices exist for attaching mud flaps to vehicles that are not originally equipped with mud flaps or for providing alternative locations for attaching mud flaps. One example of an existing device utilizes a receiver hitch mounted at the rear portion of a vehicle. As shown in FIG. 1, a type of commonly used receiver hitch 10 includes a generally lateral transverse bar 110 and a hitch receiver member 120 extending rearward from the middle point of the transverse bar 110 for receiving the trailer hitch. Certain models of receiver hitch also have flanges 150 and 160 near or at the two end openings 130 and 140 of the transverse bar 110, as shown in FIG. 1.

Some conventional devices include mud flaps, attached to arms that can be inserted into the transverse bar 110 through the end openings 130 and 140. To prevent the arms from falling out of the receiver hitch 10, the conventional devices employ bolts, rivets and the like that are threaded through holes drilled in various locations on the receiver hitch 10. However, drilling holes on the receiver hitch may negatively affect the structural integrity of the receiver hitch, and are often not recommended by the receiver hitch manufacturers. Additionally, the need to structurally modify the receiver hitch is often inconvenient to end users who wish to mount such mud flaps on their own vehicles.

Conventional devices that do not require structural modification of the receiver hitches typically include numerous pieces joined together to accomplish positioning the mud flaps and preventing the mud flap arms from sliding relative to the transverse bar. This arrangement increases the effort required to manufacture the devices, and possibly results in reduced device integrity. The conventional devices also typically require the arm to be large enough to snugly fit inside the transverse bar. Due to the large size of typical transverse bars, the arms tend to be unnecessarily bulky and heavy.

The present invention is directed to alleviating one or more of the aforementioned problems.

SUMMARY OF THE INVENTION

In accordance with one aspect of the present invention, a mud flap system is provided. The mud flap system is arranged and configured for attachment to a receiver hitch mounted on a vehicle. The receiver hitch includes a transverse bar which includes a tubular wall. The mud flap system includes (a) a mud flap, (b) an integral (i.e., one-piece) beam having a first portion attached to the mud flap and a second portion fastenable to the transverse bar, and (c) a retaining device mounted on the beam and configured to fasten the second portion of the beam to the transverse bar without penetrating any portion of the tubular wall.

In accordance with another aspect of the present invention, the mud flap system described above may be adapted for use with a transverse bar that has a protuberance, such as a flange, thereon. The second portion of the beam is adapted to be inserted into the opening in the ends of the transverse bar. The retaining device includes an integral retaining block that can be fastened to the beam. The retaining block also has a groove that engages the protuberance on the tubular bar when the retaining block is fastened to the beam.

In accordance with another aspect of the present invention, the retaining device of the mud flap system above may include a U-bolt fed through two holes in a brace. The U-bolt and the brace form a loop of a sufficient size to encompass the end of the transverse bar. When the U-bolt is tightened sufficiently, then the beam is secured to the transverse bar.

In accordance with another aspect of the present invention, in cases where the beam is designed to be inserted into the opening formed in the end of the transverse bar, spacers such as bolts may be attached to the inserted portion of the beam to ensure a snug fit of the beam inside the transverse bar. In accordance with this aspect of the invention, a beam of a substantially smaller cross-section than that of the transverse bar may be used.

In accordance with another aspect of the present invention, the beam may be bent so that the first portion attached to the mud flap and the second portion attached to the transverse bar form a predetermined angle with respect to each other. The angle is substantially different from 180 degrees, i.e., the two portions of the beam are not co-linear. The angle is chosen such that the mud flap is substantially perpendicular to the length direction of the vehicle in case where the portion of the transverse bar that the beam is inserted into is not substantially perpendicular to the length direction of the vehicle.

In accordance with another aspect of the present invention, a method for attaching a mud flap to a receiver hitch having a transverse bar having a first end and a second end, an opening formed in each end of the transverse bar, comprising the acts of: (a) mounting the mud flap on a first portion of an integral beam, (b) inserting a portion of the beam into the transverse bar through one end of the transverse bar, (c) engaging a groove in an integral retaining block to a protuberance, such as a flange on the transverse bar; and (d) fastening the retaining block to the beam. The method may further include mounting spacers on the inserted portion of the beam to ensure a snug fit of the beam inside the transverse bar.

BRIEF DESCRIPTION OF THE DRAWINGS

Other objects and advantages of the invention will become apparent upon reading the following detailed description and upon reference to the drawings in which.

Figure 1:
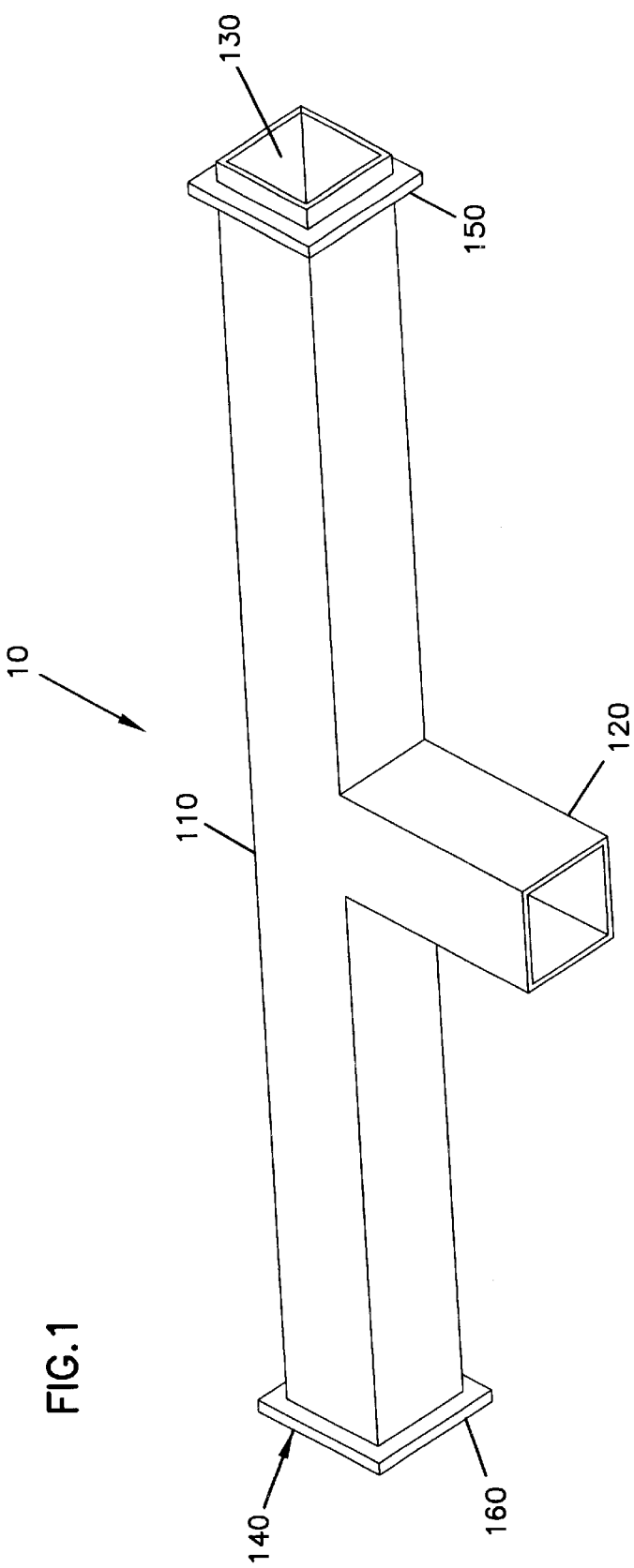
FIG. 1 schematically illustrates a receiver hitch.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of every possible implementation are described in this specification. It will of course be appreciated that in the development of any such actual embodiment, numerous implementation-specific decisions must be made to achieve the developers' specific goals, such as compliance with system-related and business-related constraints, which may vary from one implementation to another. Moreover, it will be appreciated that such a development effort might be complex and time-consuming, but would nonetheless be a routine undertaking for those of ordinary skill in the art having the benefit of this disclosure.

Figure 2:
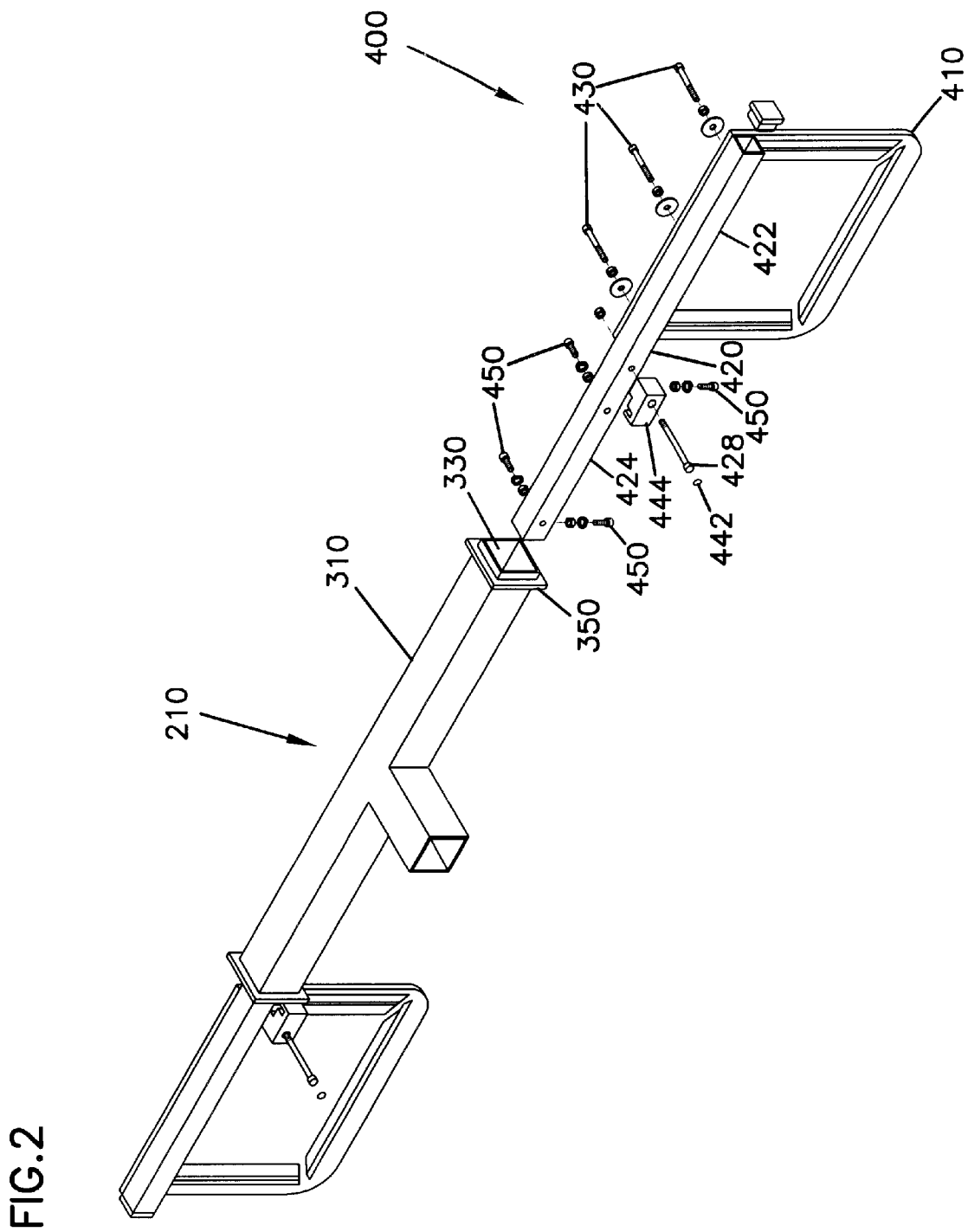
FIG. 2 schematically illustrates a mud flap system in accordance with one aspect of the present invention.
Figure 3:
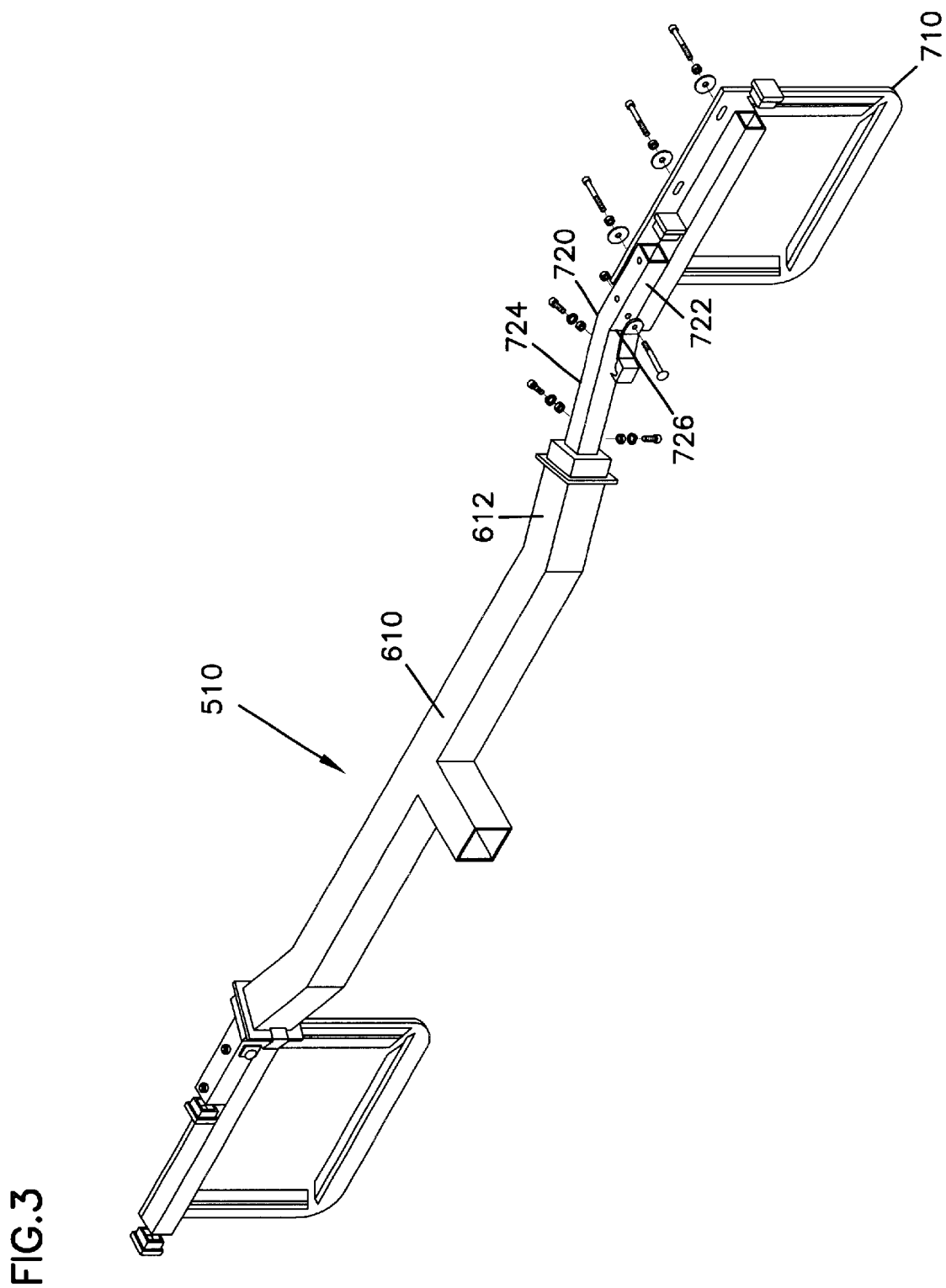
FIG. 3 schematically illustrates a mud flap system in accordance with another aspect of the present invention.

Referring to FIG. 2, one embodiment of the present invention is a mud flap system 400 attachable to a receiver hitch 210 having a transverse bar 310, oriented substantially transverse to the longitudinal axis of the vehicle to which it is attached, and a protuberance in the form of a flange 350 near one end opening 330 of the transverse bar 310. The mud flap system 400 includes a mud flap 410, which may be made of any materials known to be suitable for making mud flaps. Examples include rubber, plastics and metal. A beam assembly includes a beam 420, which is attached to the mud flap 410 at a first portion 422 by any suitable fastening device, such as bolts 430. The beam may be made of any suitable material, including aluminum, steel, hard plastic and composite materials. The beam may be of any structural form strong enough to withstand the conditions encountered during normal use of the vehicle. Tubular beams, i.e., hollow tubes comprising tabular walls are particularly desirable due to their light weight and strength they afford, although beams with solid cross sections may also be used. The second portion 424 of the beam 420 may be inserted into the transverse bar 310. If the cross-sectional size of the second portion 424 is substantially smaller than that of the transverse bar 310, spacers such as bolts 450 may be mounted on the second portion 424, and thus inserted inside the transverse bar 310 when the second portion 424 is inserted into the transverse bar 310, so that the fit of the beam assembly inside the transverse bar 310 is snug. The cross section of the beam 420 may be of any suitable shape, including a square, a circle and/or a rectangle. For a beam 420 designed to be inserted in to the transverse bar 300, the cross section of the beam 420 may be chosen to be similar in shape as the cross section of the transverse beam 310 (square beam 420 for a square transverse bar 310, for example). A retaining device, such as an integral retaining block 440, may be fastened to the beam 420 by any suitable means such as a bolt 442. As used in this application, the term "integral" denotes a single piece of material, as opposed to multiple pieces of material joined together. The retaining block 440 has a groove 444 so that a portion of the flange 350 snugly fits in the groove when the second portion of the beam 420 is inserted into the transverse bar 310, and the retaining block 440 is fastened to the beam 420.

Figure 4:
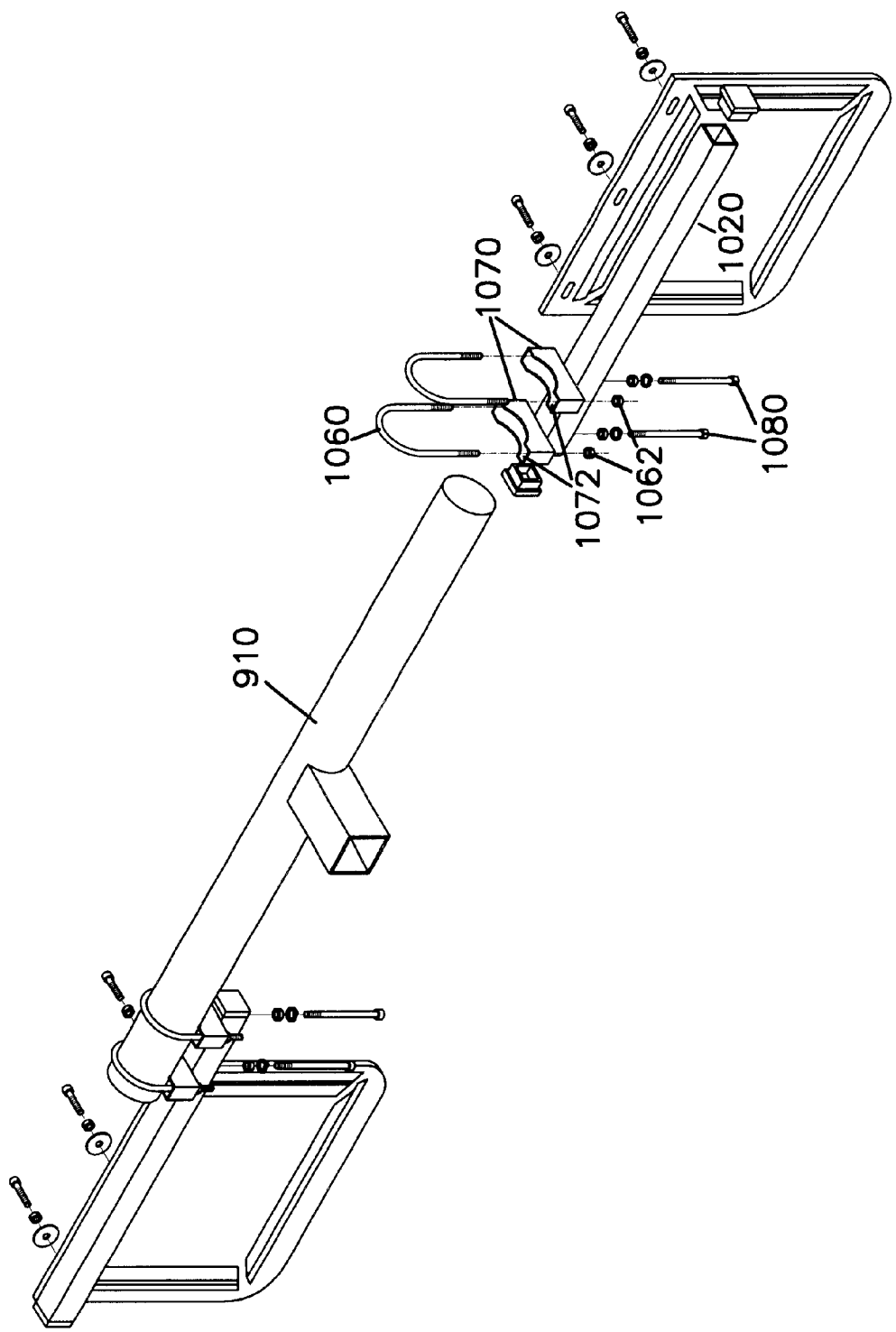
FIG. 4 schematically illustrates a mud flap system in accordance with yet another aspect of the present invention.

For receiver hitches having certain types of transverse bars, such as round transverse bars, as shown in FIG. 4, the beam 1020 may be more conveniently clamped to the transverse bar 910 by suitable devices such as U-bolts 1060 and Braces 1070. The braces 1070 may be attached to the beam 1020 by, for example, bolts 1080 The braces 1070 have holes 1072 for passing the legs of the U-bolts 1060, which can be secured to the braces 1070 by nuts 1062. The U-bolts 1060 and braces 1070 form a loop sufficiently large to encompass the transverse bar 910. The beam 1020 is fastened to the transverse bar 910 by tightening the nuts 1062.

Although only one mud flap assembly is described in each embodiment above, as one skilled in the art can readily appreciate, a second mud flap can typically be attached to the opposite end of the transverse bar. The two assemblies are in substantially symmetrical arrangement with respect to the each other. In the interest of brevity and clarity, the details of the second assembly are omitted herein.

Figure 5:
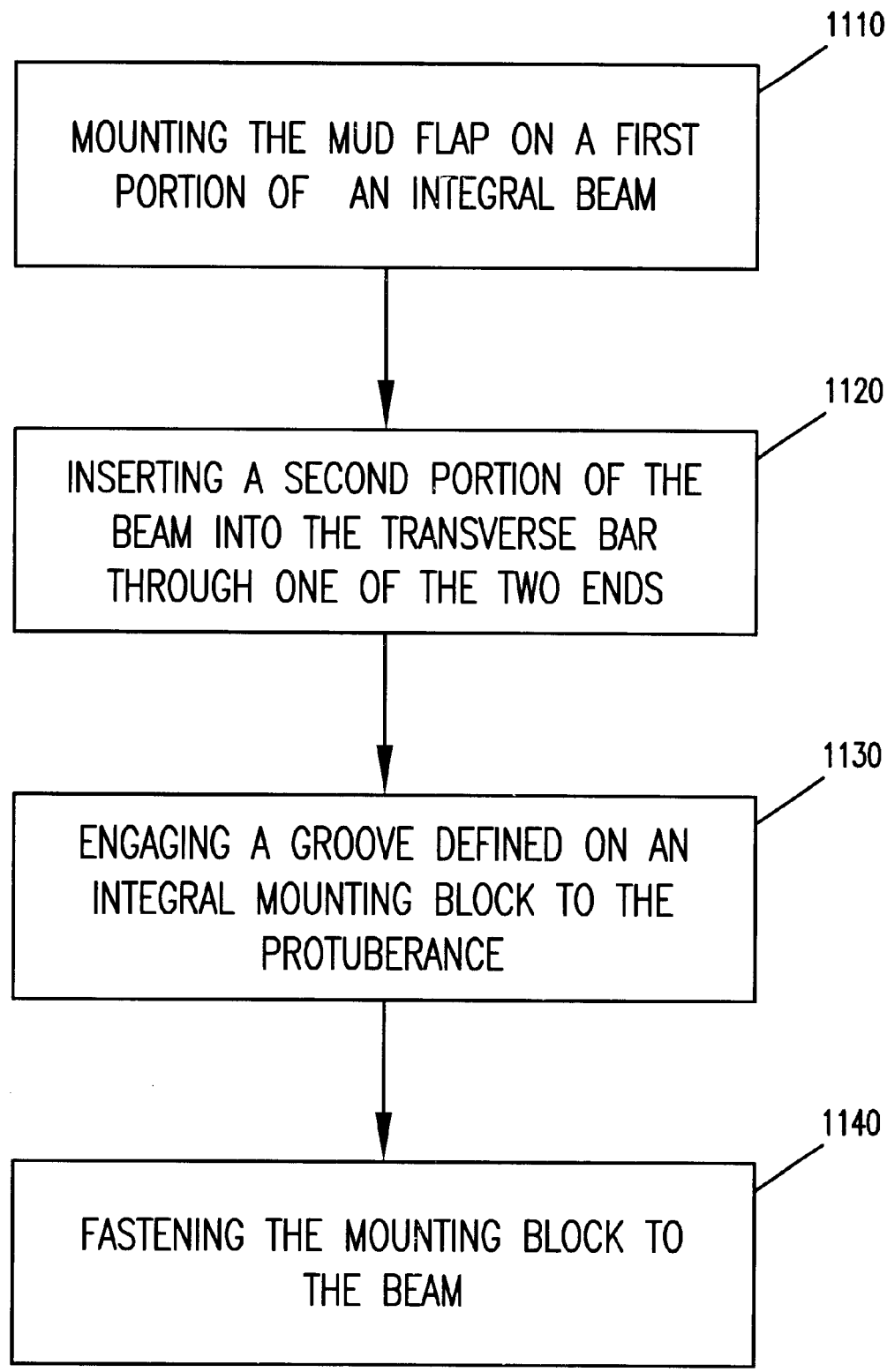
FIG. 5 outlines the steps in a method in accordance with one aspect of the present invention.

As outlined in FIG. 5, one way to practice the present invention includes the following step in attaching a mud flap to a transverse bar of a receiver hitch, in which the transverse bar has a protuberance near each end:

Step 1 (1110), mounting the mud flap on a first portion of an integral beam;

Step 2 (1120), inserting a second portion of the beam into the transverse bar through one of the two ends;

Step 3 (1130), engaging a groove defined on an integral retaining block to the protuberance; and Step 4 (1140), fastening the retaining block to the beam.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A mud flap system, of the type which can be attached to a trailer receiver hitch, the mud flap system comprising:
   (a) a mud flap; and
   (b) a beam assembly comprising a first portion attachable to the mud flap and a second portion insertable into a tubular opening of a tubular transverse bar of the trailer receiver hitch; and
   (c) a retaining block configured to lock the beam assembly to the transverse bar, wherein the retaining block is fastenable to the beam assembly and defines a groove that engages at least a portion of a flange on the tubular transverse bar when the retaining block is fastened to the beam assembly;
      wherein the beam assembly further comprises a spacer mounted on the second portion, adapted to be positioned inside the tubular transverse bar when the second portion is inserted into the tubular opening and having a sufficient size to ensure a substantially snug fit of the second portion of the beam assembly within the transverse bar.

2. The mud flap system of claim 1, wherein the spacer comprises a bolt attached to the second portion of the beam.

3. The mud flap system of claim 1, wherein the first and second portions of the beam form a predetermined angle substantially different from 180 degrees relative to each other, whereby the mud flap is substantially perpendicular to the direction along the length of the vehicle when the second portion of the beam is positioned inside the transverse bar when the segment of the transverse bar containing the second portion of the beam is not substantially perpendicular to the direction along the length of the vehicle.

4. The mud flap system of claim 1, wherein the first and second portions of the beam form a predetermined angle substantially different from 180 degrees relative to each other, whereby the mud flap is substantially perpendicular to the direction along the length of the vehicle when the second portion of the beam is positioned inside the transverse bar when the segment of the transverse bar containing the second portion of the beam is not substantially perpendicular to the direction along the length of the vehicle.

5. The mud flap system of claim 2, wherein the first and second portions of the beam form a predetermined angle substantially different from 180 degrees relative to each other, whereby the mud flap is substantially perpendicular to the direction along the length of the vehicle when the second portion of the beam is positioned inside the transverse bar when the segment of the transverse bar containing the second portion of the beam is not substantially perpendicular to the direction along the length of the vehicle.

6. A mud flap system attachable to a trailer receiver hitch, the mud flap system comprising:
   (a) a mud flap; and
   (b) a beam assembly comprising an integral beam attachable to the mud flap; and
   (c) a retaining device mounted on the beam assembly and configured to fasten the beam to a segment of a transverse bar of the trailer receiver hitch without penetrating any portion of the tubular wall;
   wherein the retaining device comprises a U-bolt having two ends and a brace defining two holes for feeding the two ends of the U-bolt therethrough wherein the U-bolt and the brace forming a loop of a sufficient size to encompass an end of the transverse bar therethrough.

7. The mud flap system of claim 6, wherein the beam comprising a first and second portions that form a predetermined angle substantially different from 180 degrees relative to each other, whereby the mud flap is substantially perpendicular to the direction along the length of the vehicle when the beam is fastened to the transverse bar when the segment of the transverse bar is not substantially perpendicular to the direction along the length of the vehicle.

8. A method of attaching a mud flap to a tubular transverse bar of a receiver hitch, the transverse bar having two ends and an opening at each end, the transverse bar having a protuberance near each end, the method comprising the steps of:
   (a) mounting the mud flap on a first portion of an integral beam;
   (b) inserting a second portion of the beam into the transverse bar through one of the two ends;
   (c) engaging a groove defined on an integral retaining block to the protuberance;
   (d) fastening the retaining block to the beam; and
   (e) ensuring a substantially snug fit of the beam within the tubular bar by mounting a spacer on the second portion of the beam such that the spacer is inside the transverse bar when the second portion of the beam is inserted into the transverse bar.

* * * * *

UNITED STATES PATENT AND TRADEMARK OFFICE
CERTIFICATE OF CORRECTION

PATENT NO. : 6,375,223 B1  
DATED : April 23, 2002  
INVENTOR(S) : Kirckof

It is certified that error appears in the above-identified patent and that said Letters Patent is hereby corrected as shown below:

Column 3,
Line 37, "tabular" should read -- tubular --

Column 6,
Line 2, "forming" should read -- form --

Signed and Sealed this

Nineteenth Day of November, 2002

Attest:

Attesting Officer

JAMES E. ROGAN
Director of the United States Patent and Trademark Office